No. 610,074. Patented Aug. 30, 1898.
T. J. MURRAY.
AIR AND WATER HEATING APPARATUS FOR LOCOMOTIVES.
(Application filed Sept. 28, 1897.)
(No Model.) 2 Sheets—Sheet 1.
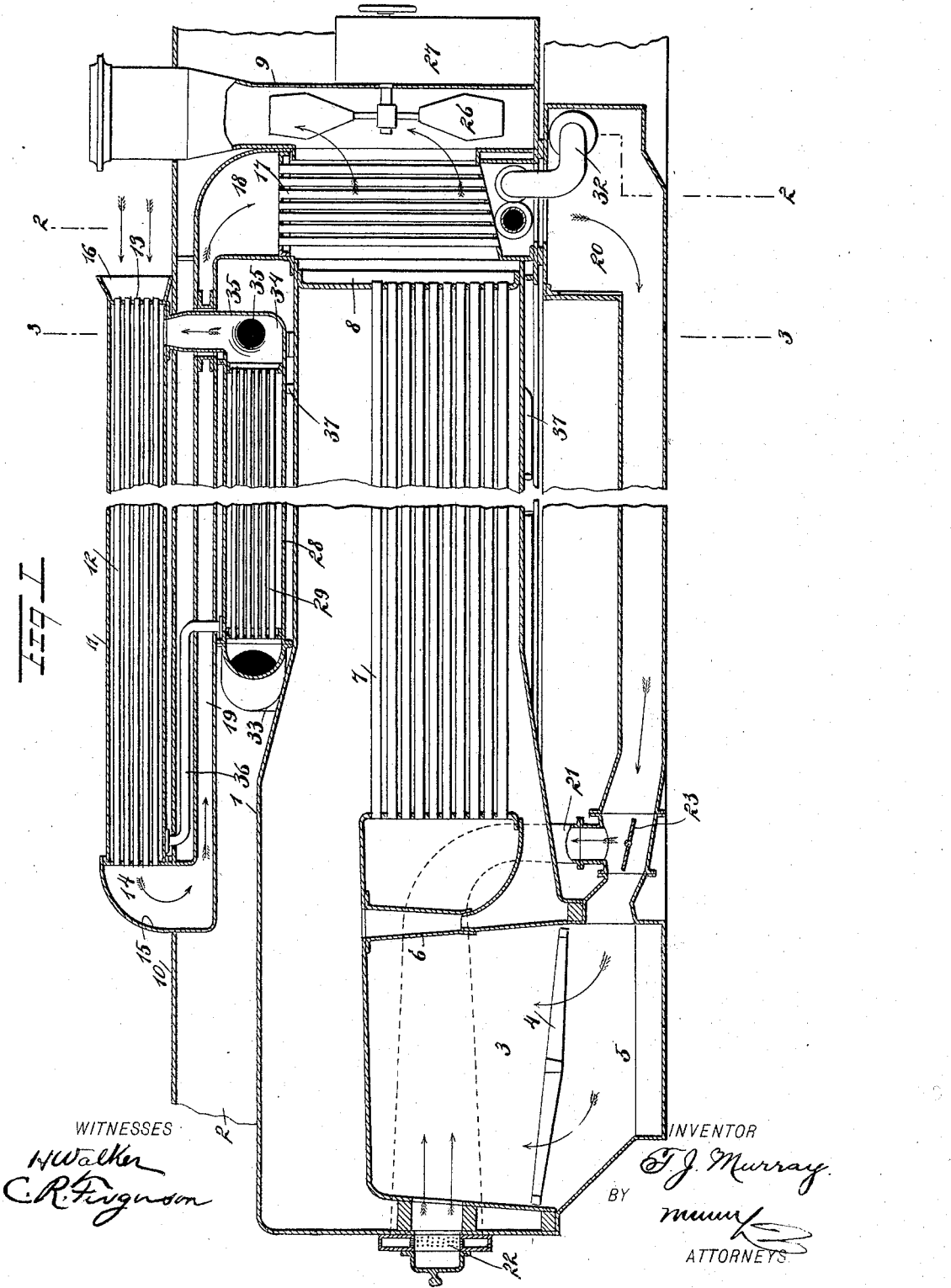

No. 610,074. Patented Aug. 30, 1898.
T. J. MURRAY.
AIR AND WATER HEATING APPARATUS FOR LOCOMOTIVES.
(Application filed Sept. 28, 1897.)
(No Model.) 2 Sheets—Sheet 2.
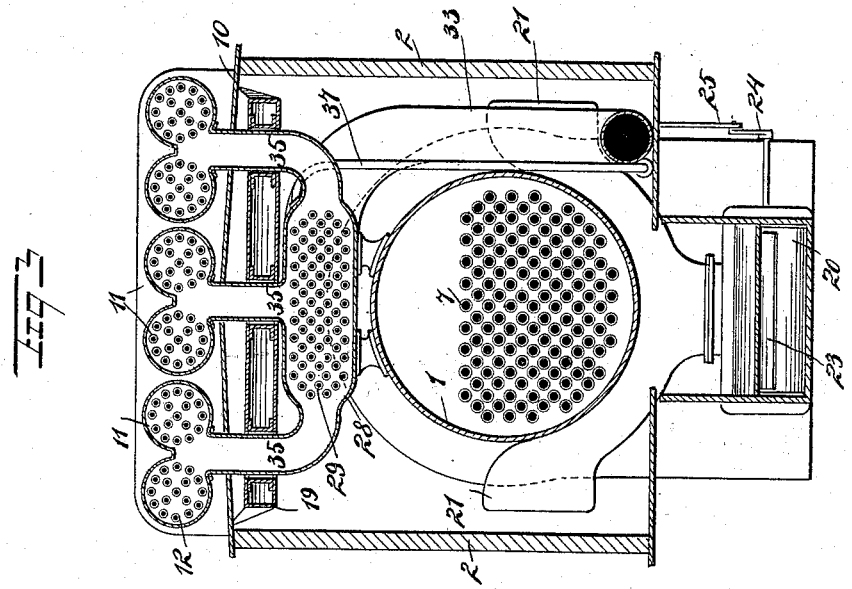
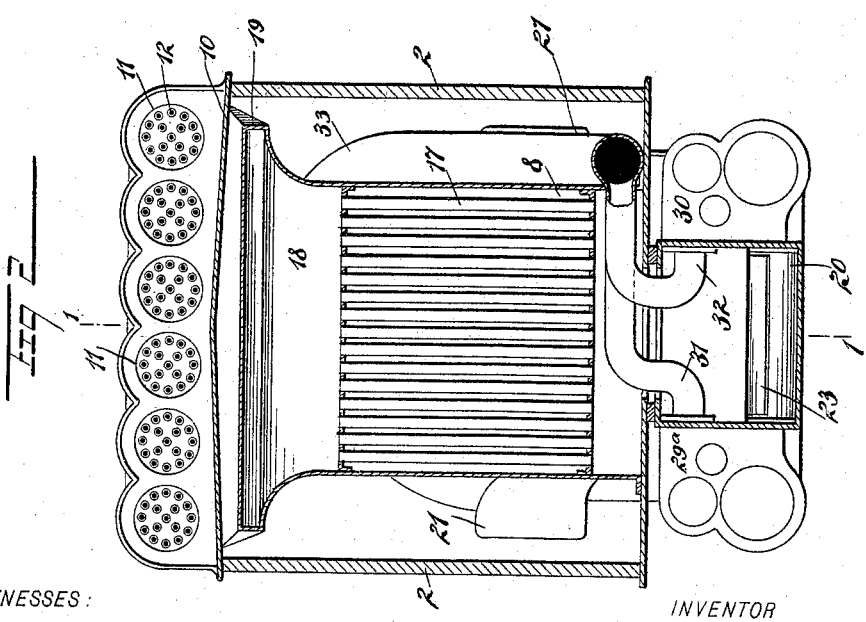
WITNESSES: INVENTOR
H. Walker T. J. Murray.
C. R. Ferguson BY
ATTORNEYS.

UNITED STATES PATENT OFFICE.

THOMAS J. MURRAY, OF BUTTE, MONTANA.

AIR AND WATER HEATING APPARATUS FOR LOCOMOTIVES.

SPECIFICATION forming part of Letters Patent No. 610,074, dated August 30, 1898.

Application filed September 28, 1897. Serial No. 653,358. (No model.)

*To all whom it may concern:*

Be it known that I, THOMAS J. MURRAY, of Butte, in the county of Silver Bow and State of Montana, have invented a new and Improved Air and Water Heating and Condensing Apparatus for Locomotives, of which the following is a full, clear, and exact description.

This invention relates particularly to air and feed-water heating and condensing apparatus for locomotive-engines; and the object is to provide a simple and effective means for drawing in atmospheric air and heating the same before discharging it into the fire-box; and a further object is to so arrange a condenser and feed-water heater that while they perform their own particular function they will also aid in heating air.

When the locomotive is standing at rest, the fan will be kept running by its own independent engine, the ash-pit damper shut, and the side air-dampers opened. The air will then be drawn through the condenser-tubes, down through the heater, along the ducts and past the side air-dampers and over the fires, through the flues and out through the fan, and exhausted out of the stack. The fan-engine, together with the other auxiliary machinery that is in action—such as electric-light engine, brake air-pumps, &c.—while the locomotive is motionless, all exhaust into the condenser. Thus it will be seen that the fan in drawing the air through the condenser cools and condenses exhaust-steam above stated, and so produces and maintains a practically complete vacuum, thus relieving the pistons of the main engines of all back pressure and enabling a rapid start to be made out of a depot and with a heavy train instead of having to use high-pressure steam in the low-pressure cylinders, as is now necessary on compound locomotives on starting. Further, as the ash-pit air-damper is closed the air is passed over the fires, and so does not disturb them and raise excessive steam, and the air being heated by passing through the heater to some degree will not cause the plates of the fire-box to contract and crack, joints to leak, &c. On starting the engine the fireman will simply open the ash-pit damper and partly close the side air-dampers, and thus have a brisk steaming fire at once, and the fan being run faster more air is drawn through the condenser and the steam from the main engines condensed. The water of condensation is at all times drained to the feed-heater and from there delivered by injectors or pumps into the boiler, thus keeping the condenser clear of water, vapor, and air.

I will describe an apparatus embodying my invention and then point out the novel features in the appended claims.

Reference is to be had to the accompanying drawings, forming a part of this specification, in which similar characters of reference indicate corresponding parts in all the views.

Figure 1 is a vertical section on the line 1 1 of Fig. 2, showing a portion of a locomotive embodying my invention. Fig. 2 is a section on the line 2 2 of Fig. 1, and Fig. 3 is a section on the line 3 3 of Fig. 1.

Referring to the drawings, 1 designates the boiler of a locomotive, which, as here shown, is arranged in a housing or casing 2. In the rear end of the boiler is a fire-box 3, having the grate 4 and the ash-pan 5. The products of combustion discharge from the fire-box 3 between the water-legs 6 and through the horizontal flues 7, which discharge into the smoke-box 8, communicating with the smoke-stack 9.

Arranged on the roof 10 of the housing is a condenser, here shown as a series of thin metal cylinders 11, arranged side by side, and arranged in each cylinder 11 are a number of horizontally-disposed air-tubes 12, which at their forward ends pass through a front header 13 and at their rear ends through a rear header 14, and the tubes of the several cylinders discharge into a receiving-chamber 15. I have here shown a series comprising six condensing-cylinders; but it is obvious that more or less may be employed without departing from the spirit of my invention.

Extended from the front header 13 and beyond the front ends of the tubes is a flaring flange 16, which will direct atmospheric air to the several tubes. Arranged vertically in the smoke-box 8 is a series of air-heating tubes 17, the upper ends of which communicate with a chamber 18, which communicates with the chamber 15 through a flue 19. The lower ends of the tubes 17 communicate with an air-chest 20, which extends along underneath the boiler and opens into the ash-pan 5 or at a point below the grate-bars 4.

Connecting with the hot-air chest 20 at a point forward of the fire-box are pipes or ducts 21, which lead along the sides of the fire-box 3 and communicate with the interior of the fire-box above the grate through perforations 22 in the fire-door casing and through said fire-door opening. The air may be more or less deflected to enter above and below the grate-bars by means of a damper 23, arranged to swing in the hot-air chest, and near its junction with the pipes 21 this damper 23 has a crank 24 on its shaft, from which an operating-rod 25 extends to a convenient place for manipulation by a fireman.

Arranged in the smoke-stack 9 and forward of the heating-tube 17 is an induction-fan 26, which may be driven by a suitable motor arranged in a box 27 forward of the smoke-stack, whereby the draft will be induced instead of being forced, thus eliminating many of the dangers and disadvantages of forced draft.

Mounted upon the boiler 1 and within the housing is a feed-water heater comprising a shell 28, having steam-tubes 29 extended longitudinally through it. These tubes have their ends extended through suitable headers at the ends of the shell 28. The exhaust-steam from the cylinders $29^a$ and 30 leads through the pipes 31 and 32 into a pipe 33, which discharges into the chamber of the feed-water heater rearward of the rear header. The steam passing through the tubes 29 discharges into a chamber 34, which has pipe connections 35 with the several condenser-cylinders. Each condenser-cylinder at its rear end is connected by a small pipe 36 with the cylinder 28 of the feed-water heater, and a pipe 37 leads from the feed-water heater to a suitable injector.

In operation the steam upon passing through the tubes of the feed-water heater will pass into the several condensing-cylinders and coming into contact with the cold surfaces of the condensers will be condensed. The water formed will pass through the pipes 36 into the feed-water-heating cylinder 28. It will be seen that the surface for condensation is cooled by the passage of air which is drawn into the tubes by the fan in the smoke-box; also, that the steam is on the outside of the small tubes in the condenser; further, that the outer surface of the large cylinders of the condenser is an efficient cooling-surface, being exposed to the air which circulates at a speed equal to that of the engine. The air on passing through the condenser becomes heated to a certain point by reason of its absorbing heat from the exhaust-steam. After leaving the condenser the air passes through the flue 19 and thence through the heating pipes or tubes 17, which, as before stated, are placed in the path of the hot waste gases coming out of the boiler-tubes in the furnace. The air being heated next passes through the hot-air chest 20, from which it is directed either under or over the fire, either wholly or partially at the will of the fireman, by means of the damper 23. The air for the top of the fire passes through the pipes 21 and thence into the furnace or fire-box, as before described. The air from the bottom draft passes through the ash-pan and up through the fire-bars or grate and into the fire-box. The waste products of combustion are drawn through the boiler-tubes between the tubes of the air-heater and are finally expelled from the smoke-stack by means of the fan.

From the foregoing it will be seen that the fan is necessary to the induced draft and air-heating apparatus, and also that the air is partly heated in passing through the condenser by absorbing the heat of the exhaust-steam. Therefore the surface condenser is to be considered in combination with the air-heating arrangements and fan, as the fan is necessary for both. As the feed-heater absorbs some of the heat of the exhaust-steam before it passes to the condenser and also as the condenser is attached directly to the feed-heater, it becomes practically a part of the condenser, and therefore the surface condenser, feed-heater, and air-heating and induced-draft arrangements may be taken as one, each being directly connected and a useful adjunct of the others.

Having thus described my invention, I claim as new and desire to secure by Letters Patent—

1. In a locomotive-engine, the combination with the boiler, fire-box, and smoke-stack, of a condenser above the boiler, a series of air-heating tubes arranged between the discharge end of the boiler and the smoke-box, a flue connecting the rear end of the condenser with the air-heating tubes, an air-chest below the boiler, and with the front end of which the said air-heating flues communicate, the rear end of the air-chest being connected with the fire-box above and below the grate thereof, and a fan in the smoke-box, substantially as and for the purpose set forth.

2. In a locomotive-engine, the combination with the boiler, fire-box, smoke-box, and smoke-stack, of a condenser above the boiler and having an air-chamber at its rear end, a series of air-heating tubes in the smoke-box, a chamber above the smoke-box and with which the upper ends of the air-heating flues communicate, a flue leading from the chamber at the rear end of the condenser to the chamber above the smoke-box, an air-chest below the boiler and with the front end of which the lower ends of the air-heating tubes communicate, a connection between the rear end of the air-chest and the fire-box, above and below the grate thereof, and a fan in the smoke-box, substantially as described.

3. In a locomotive-engine, the combination with the boiler, cylinders, fire-box, and smoke-stack, of a condenser above the boiler, a series of air-heating tubes arranged between the discharge end of the boiler and the smoke-box, a flue connecting the rear end of the condenser with the air-heating tubes, an air-chest below the boiler and communicating at its front with the air-heating tubes and at its rear end with the fire-box, a fan in the smoke-box, a feed-water heater between the condenser and boiler and with which the exhaust-pipes from the cylinders are connected, and a connection between the feed-water heater and condenser to allow the exhaust-steam after passing through the heater to enter the condenser, substantially as described.

4. In a locomotive-engine, the combination with the boiler, cylinders, fire-box, and smoke-stack, of a condenser above the boiler, a series of air-heating tubes arranged between the discharge end of the boiler and the smoke-box, a flue connecting the rear end of the condenser with the air-heating tubes, an air-chest below the boiler and having its front end communicating with the heating-tubes and its rear end with the fire-box, a fan in the smoke-box, a feed-water heater comprising a shell having a chamber at each end, and pipes in said shell, exhaust-steam pipes leading from the cylinders to the chamber at the rear end of the feed-water heater, pipes connecting the condensers with the chamber at the front end of the feed-water heater, and a pipe leading from the rear end of the condenser to the shell of the said heater, substantially as described.

THOMAS J. MURRAY.

Witnesses:
RAYMOND H. HORNBROOK,
CHAS. W. SMITH.